(No Model.)
W. T. FORBES.
REFRIGERATING APPARATUS.
No. 321,702. Patented July 7, 1885.
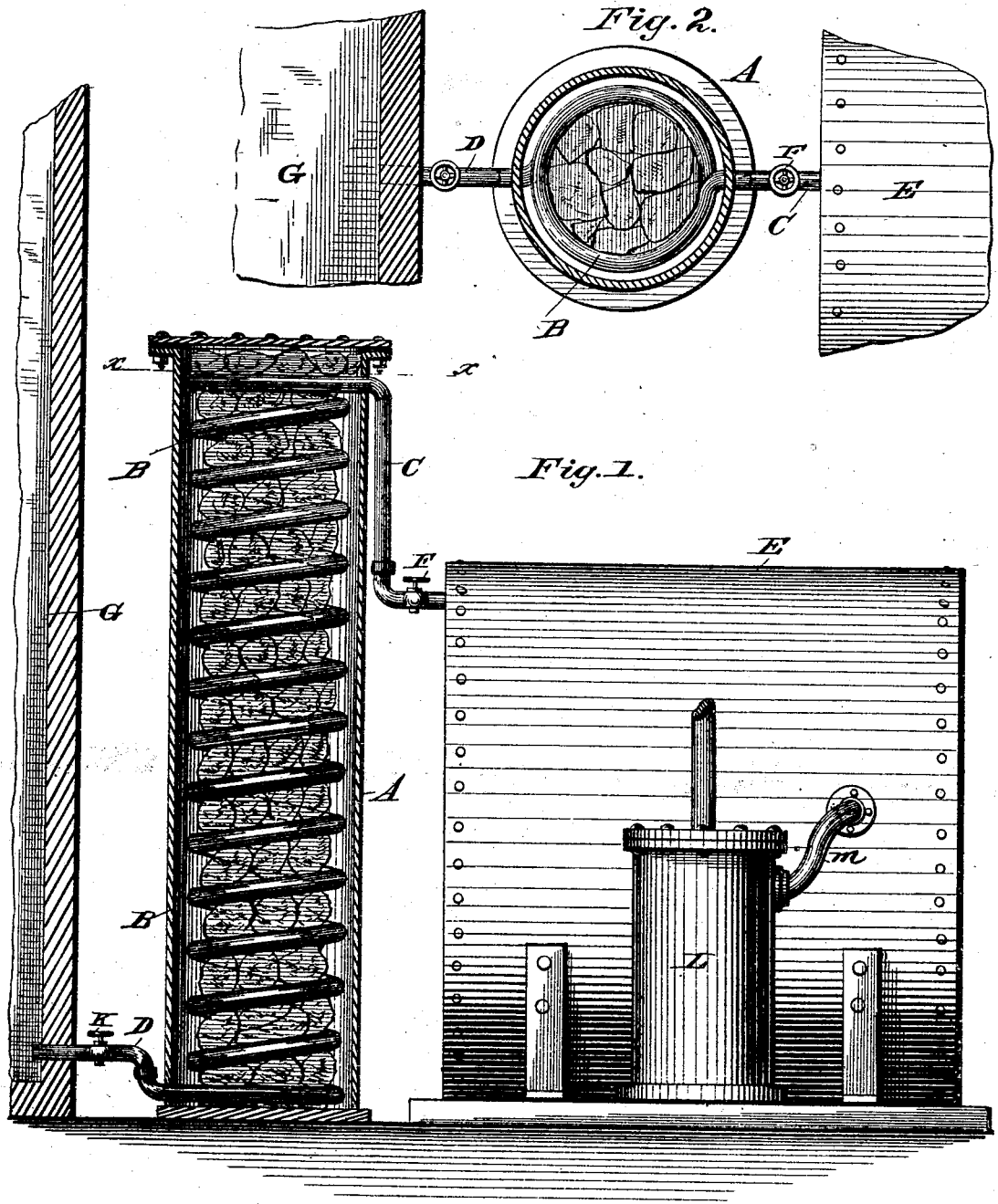
WITNESSES
Phil C Masi
Grace M Craig
INVENTOR
Walter T. Forbes,
by Anderson & Smith
his Attorneys

UNITED STATES PATENT OFFICE.

WALTER T. FORBES, OF ATLANTA, GEORGIA.

REFRIGERATING APPARATUS.

SPECIFICATION forming part of Letters Patent No. 321,702, dated July 7, 1885.

Application filed April 21, 1885. (No model.)

*To all whom it may concern:*

Be it known that I, WALTER T. FORBES, a citizen of the United States, residing at Atlanta, in the county of Fulton and State of Georgia, have invented certain new and useful Improvements in Refrigerating Apparatus; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a side elevation, partly in section. Fig. 2 is a horizontal section on line $x$ $x$, Fig. 1.

This invention has relation to means for cooling-rooms, storage chambers, refrigerator-boxes, &c.; and it consists in the construction and novel arrangement of devices, all as hereinafter set forth, and pointed out in the appended claim.

In the accompanying drawings, the letter A designates an ice vessel or tank, which is designed to be closed when packed with ice. In this chamber is located a spirally-coiled tube, B, having its ends C and D extending from the tank, in order that proper connections may be made.

E represents a storage-tank for compressed air, to which the end or extension C of the coiled tube B extends. Usually a section of pipe secured to the tank E is connected to the end C of the coiled tube by an air-tight coupling. F is a check-valve in the connecting-pipe, whereby the flow of air from the storage-tank can be regulated or cut off, as may be required.

G indicates an apartment, vessel, or refrigerator-box, to which the end D of the coiled pipe B is connected by means of a suitable section, H, of pipe, preferably coupled, or by an extension of the tube B. This connection is usually supplied with a check-valve, K, for regulating the flow of air into the chamber G.

L indicates an air-pump, which is connected by a pipe, $m$, to the storage-tank, and serves to charge the latter when necessary.

The air under pressure in the storage-tank is fed through the coiled pipe, and is cooled therein by the refrigerating material in the tank, and passes from the discharging end of the pipe into the apartment or chamber to be cooled in a continuous stream, which is under control by means of a check-valve.

Having described this invention, what I claim, and desire to secure by Letters Patent, is—

The combination, with the closed ice-chamber and the spirally-coiled tube B therein, having projecting ends, of the storage-tank and the chamber or box to be cooled respectively connected to said projecting ends by pipes, a check-valve, and the air-pump connected to the storage-tank, substantially as specified.

In testimony whereof I affix my signature in presence of two witnesses.

WALTER T. FORBES.

Witnesses:
PHILIP C. MASI,
THEO. MUNGEN.